US012789671B2

(12) United States Patent
Koerger et al.

(10) Patent No.: US 12,789,671 B2
(45) Date of Patent: Nov. 10, 2026

(54) VEHICLE SEAT

(71) Applicant: Bayerische Motoren Werke Aktiengesellschaft, Munich (DE)

(72) Inventors: Christian Koerger, Munich (DE); Rudolf Rackl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 263 days.

(21) Appl. No.: 18/707,911

(22) PCT Filed: Jan. 17, 2023

(86) PCT No.: PCT/EP2023/050975
§ 371 (c)(1),
(2) Date: May 7, 2024

(87) PCT Pub. No.: WO2023/156109
PCT Pub. Date: Aug. 24, 2023

(65) Prior Publication Data
US 2026/0158971 A1 Jun. 11, 2026

(30) Foreign Application Priority Data
Feb. 15, 2022 (DE) ..................... 10 2022 103 455.0

(51) Int. Cl.
*B60N 2/00* (2006.01)

(52) U.S. Cl.
CPC ........ *B60N 2/0034* (2023.08); *B60N 2210/46* (2023.08)

(58) Field of Classification Search
CPC .................................................... B60N 2/0034
See application file for complete search history.

(56) References Cited

U.S. PATENT DOCUMENTS 10,315,601 B2 * 6/2019 Holzapfel ............ B60N 2/0024
10,926,662 B2 * 2/2021 Maguire .............. B60N 2/0025
11,040,696 B2 * 6/2021 Kang ....................... B60N 2/28
11,214,172 B2 * 1/2022 Althaus ................ B60N 2/0026
(Continued)

FOREIGN PATENT DOCUMENTS

CN 118234643 A * 6/2024 ........... B60N 2/0034
DE 102 47 404 A1 4/2004
(Continued)

OTHER PUBLICATIONS

International Search Report (PCT/ISA/210) issued in PCT Application No. PCT/EP2023/050975 dated Mar. 30, 2023 with English translation (6 pages).
(Continued)

*Primary Examiner* — Rodney B White
(74) *Attorney, Agent, or Firm* — Crowell & Moring LLP

(57) ABSTRACT

A vehicle seat has a seat occupancy detection sensor (SBR sensor), wherein the SBR sensor is arranged flat between a seat core and a seat cover and the SBR sensor has a first upper side facing the seat cover. A pressure element is arranged between the seat cover and the first upper side. With such a vehicle seat, a standard SBR sensor can be used for all different vehicle seat designs, or a change in the detection of an SBR sensor without changing the SBR sensor itself is achieved.

10 Claims, 2 Drawing Sheets

(56) References Cited

U.S. PATENT DOCUMENTS

| | | | | |
|---|---|---|---|---|
| 11,623,590 | B2 * | 4/2023 | Liaigre | B60N 2/003 297/217.3 |
| 11,780,394 | B2 * | 10/2023 | Althaus | B60N 2/0034 307/10.1 |
| 2007/0144273 | A1 | 6/2007 | Decoster | |
| 2009/0201163 | A1 * | 8/2009 | Decoster | B60N 2/0024 340/667 |
| 2011/0163767 | A1 * | 7/2011 | Chen | B60N 2/003 324/679 |
| 2015/0137569 | A1 | 5/2015 | Goedert | |
| 2017/0369018 | A1 * | 12/2017 | Hüther | B60N 2/0025 |
| 2018/0345894 | A1 * | 12/2018 | Althaus | B60R 21/01532 |
| 2020/0376984 | A1 | 12/2020 | Zhang et al. | |
| 2020/0391693 | A1 * | 12/2020 | Kang | B60N 2/0026 |

FOREIGN PATENT DOCUMENTS

| | | | | |
|---|---|---|---|---|
| DE | 60 2004 006 894 | T2 | 1/2008 | |
| DE | 20 2014 010 081 | U1 | 2/2015 | |
| DE | 11 2013 002 748 | T5 | 4/2015 | |
| DE | 11 2018 000 027 | B4 | 6/2021 | |
| DE | 102021130347 | A1 * | 7/2022 | B60N 2/003 |
| DE | 102022103455 | A1 * | 8/2023 | B60N 2/0034 |
| EP | 1 580 080 | A1 | 9/2005 | |
| JP | 2013-112315 | A | 6/2013 | |
| JP | 2018-16154 | A | 2/2018 | |
| KR | 102037837 | B1 * | 10/2019 | H05B 3/342 |
| WO | WO 98/29849 | A2 | 7/1998 | |
| WO | WO 2005/000637 | A1 | 1/2005 | |
| WO | WO 2013/178485 | A1 | 12/2013 | |
| WO | WO 2017/129433 | A1 | 8/2017 | |
| WO | WO-2023156109 | A1 * | 8/2023 | B60N 2/0034 |

OTHER PUBLICATIONS

German-language Written Opinion (PCT/ISA/237) issued in PCT Application No. PCT/EP2023/050975 dated Mar. 30, 2023 with English translation (8 pages).

German-language Search Report issued in German Application No. 10 2022 103 455.0 dated Jul. 26, 2022 with partial English translation (10 pages).

* cited by examiner

VEHICLE SEAT

BACKGROUND AND SUMMARY

The invention relates to a vehicle seat for a motor vehicle.

With regard to the technical environment, reference is made, for example, to German utility model DE 20 2014 010 081 U1. This utility model discloses a seat occupancy sensor unit for detecting occupancy of a seat, in particular a vehicle seat, comprising:

a mounting plate with an underside and a top side, wherein, in an operationally ready state, the underside faces a floor on which the seat is mounted, and the top side faces a seat cushion of the seat, a membrane switch which reacts to pressure and has at least one active switching element, the switching state of which can be changed when a threshold value for a force acting in a direction perpendicular to the at least one active switching element is exceeded, at least one contact element, which is arranged between the top side of the mounting plate and the membrane switch, wherein the at least one contact element has a convexly curved surface which can be unrolled and the dimensions of which are equal to or greater than the membrane switch dimensions measured in the same direction, and which is provided, in at least one operating state, to at least partially enter into contact with the membrane switch at least at the location of the at least one active switching element.

A further seat occupancy sensor of the type in question is known, for example, from the International patent application with the International publication number WO 2005/000637 A1. This patent application describes a seat occupancy sensor, having at least two pressure-activable switching elements which can be assigned at a certain distance from one another to a surface of a seat in such a manner that a first switching element is assigned to a first region of a seat and a second switching element is assigned to a second region of the seat, wherein the first and second switching elements are interconnected in such a manner that a logic AND function is realized.

The SBR sensors (seat occupancy detection sensor) conventionally used in seat occupancy detection for a vehicle seat for a motor vehicle have lengthy tool preparation times and therefore lengthy change iterations when reconfiguring the SBR sensor, e.g. when changing the seat geometry or the upholstery of the vehicle seat. This has an adverse effect on the flexibility for changing the entire vehicle seat construction. Furthermore, the overall system is inflexible in the adjustment of details. The result of this is that an existing standard SBR sensor cannot be used for different vehicle seat designs (vehicle seat geometries), and therefore considerable development times for a vehicle seat and thus very high development costs for a vehicle seat arise.

Even when the seat geometry remains the same, the first version of an SBR sensor conventionally does not meet all of the detection requirements in the first hardware test and has to be adjusted in further change iterations, also in order to cover all tolerance situations for a seat construction. Since the production tools for the SBR sensor have to be adapted for each change, the process is correspondingly laborious and costly.

It is the object of the present invention to provide a measure that allows one and the same standard SBR sensor to be used for different motor vehicle seat designs (geometry, upholstery, etc.), and the adjustment of an SBR sensor to be substantially simplied and speeded up.

This object is achieved for a vehicle seat having a standard SBR sensor which is arranged flat between a seat core and a seat cover, and wherein the SBR sensor has a first upper side facing the seat cover, in that a pressure element is arranged between the seat cover and the first upperside.

The surface and the lower surface of the pressure cell (=the region of the aperture) of the SBR sensor, for example for an electric SBR sensor, are pressed together by the pressure of the upholstery layers located thereabove, this being triggered by the occupant sitting down. The pressure from the upholstery layers is somewhat diffuse and imprecise. Provision of individual pressure elements between the seat cover and the surface of the SBR sensor makes it possible for the surface of the pressure cell to be loaded in a highly specific way in the region of the aperture. With the aid of this configuration, according to the invention, of the motor vehicle with a vehicle seat, an existing standard SBR sensor can advantageously be used for a very wide variety of vehicle seat designs or vehicle seat geometries, thus saving considerable development time and therefore costs. The rapidly and flexibly adaptable pressure cells enable the pressure exerted by the occupant on the SBR sensor and its individual pressure cells via the seat construction to be changed in such a manner that, given unchanged pressure cells, a desired change in the characteristic (pressure sensitivity) can nevertheless be accomplished. This also includes the possibility of generating a local characteristic, e.g. in different regions of the seat (under buttocks, thigh region, etc.), while the pressure cells remain the same, but with pressure elements adjusted individually per pressure cell. For such an adjustment, the shape, size and material characteristic of each pressure element can be changed.

Of course, the effect according to the invention is produced not only for an electric SBR sensor, but also for pneumatic, capacitive or inductive SBR sensors.

The refinement wherein the pressure element is made from a metal and/or a plastic and/or from wood enables the developers of a vehicle seat to have a virtually unlimited selection of materials from virtually all solids or materials.

The refinement wherein the pressure element is made from an elastic material gives the developers an even greater scope for the selection of materials. The pressure element can be produced, for example, from silicone or rubber.

The pressure element is preferably cuboidal, elliptical, cylindrical, spherical, prism-shaped or in the form of a truncated cone. It is therefore also possible to adapt the pressure element in any way to suit different vehicle seat shapes, upholstery or SBR sensor positions in the vehicle seat.

In a further preferred embodiment, the pressure element has a smaller supporting surface on the side facing the seat core than on the side facing the seat cover. With this embodiment, the compressive force can advantageously be focused in a specific way on the SBR sensor.

In a preferred exemplary embodiment, at least two spatially spaced-apart SBR sensors are provided for a vehicle seat, wherein a dedicated pressure element is provided for each SBR sensor. This embodiment advantageously also permits, in conjunction with an electronic control device, conclusions to be drawn regarding the height and weight of the vehicle occupant.

In a further preferred exemplary embodiment, the pressure elements are connected to one another via connecting elements. This embodiment facilitates the installation of the pressure elements and the SBR sensors in a vehicle seat.

In a first exemplary embodiment, the SBR sensor and the pressure element form one physical unit. This also facilitates the installation of the SBR sensor in a vehicle seat.

In a second exemplary embodiment, the SBR sensor and the pressure element are separate components, which makes production somewhat more cost-effective but makes installation in the vehicle seat somewhat more difficult again.

As one exemplary embodiment use is preferably made of an SBR sensor in which the surface is a first current-conductive structure and the lower surface is a second current-conductive structure facing the seat core, wherein a spacer element having at least one aperture is provided between the surface and the lower surface, and wherein a circuit is closed when the surface and the lower surface are in contact in the region of the aperture.

The invention is explained below in more detail with reference to three figures, wherein FIGS. 1 and 2 depict the prior art and FIG. 3 an embodiment according to the refinement according to invention.

BRIEF DESCRIPTION OF THE DRAWINGS

In the following, the same reference numerals apply to the same components in FIGS. 1 to 3.

DETAILED DESCRIPTION OF THE DRAWINGS

Figure 1:
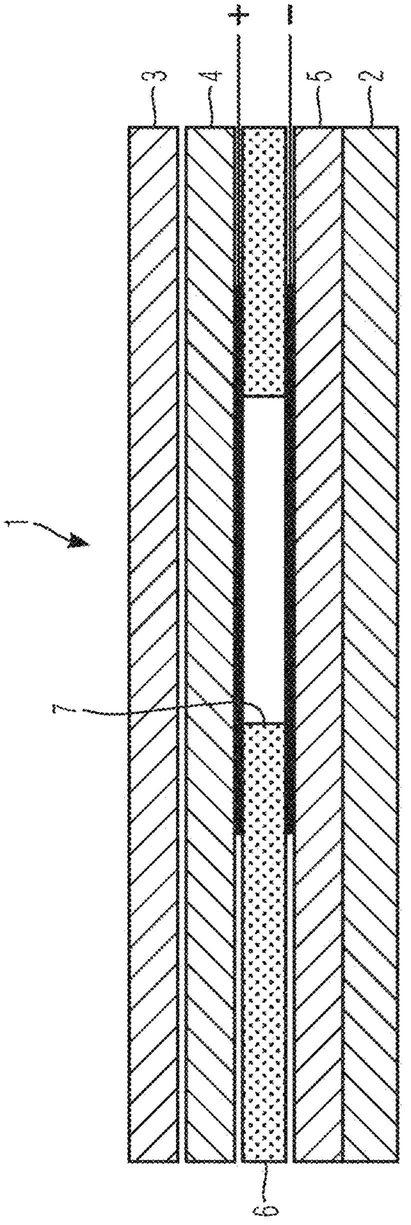
Fig. 1 Prior art
FIG. 1 is a schematic section through an SBR sensor according to the prior art, in an unloaded state.

FIG. 1 shows a schematic section through a seat occupancy detection sensor 1 (SBR sensor) according to the prior art, in an unloaded state. An unloaded state means that no pressure is exerted on the SBR sensor substantially perpendicularly to its surface. The SBR sensor 1 is provided for a vehicle seat, not illustrated specifically, for a motor vehicle, not illustrated. This can be any type of motor vehicle, for example a passenger motor vehicle, a transporter or else a truck or bus. Vehicle seat is understood as meaning not only the driver's seat, but also a front passenger's seat or rear seats.

The SBR sensor 1 is arranged flat between a seat core 2 and a seat cover 3 of a vehicle seat of a motor vehicle. Furthermore, in this exemplary embodiment, the SBR sensor 1 has a surface 4, which faces the seat cover 3 and consists of a first current-conductive structure, and a second, lower surface 5, which faces the seat core 2 and consists of a second current-conductive structure. The surface 4 and the lower surface 5 each have a carrier film with a current-conductive coating. An associated circuit is represented by a plus sign and a minus sign corresponding to a positive pole and a negative pole. Between the surface 4 and the lower surface 5, a spacer element 6 with at least one aperture 7 is provided, the spacer element keeping the surface 4 and the lower surface 5 spaced apart from each other such that, in an unloaded state of the SBR sensor 1, no current can flow between the surface 4 and the lower surface 5. When the surface 4 is in contact with the lower surface 5 in the region of the aperture 7, for example because of the weight force of an occupant of the vehicle seat, the circuit is closed and generates a signal for an electronic control device, not illustrated. This means that in each case the conductive coating of the surface 4 and of the lower surface 5 are in contact with each other.

Figure 2:
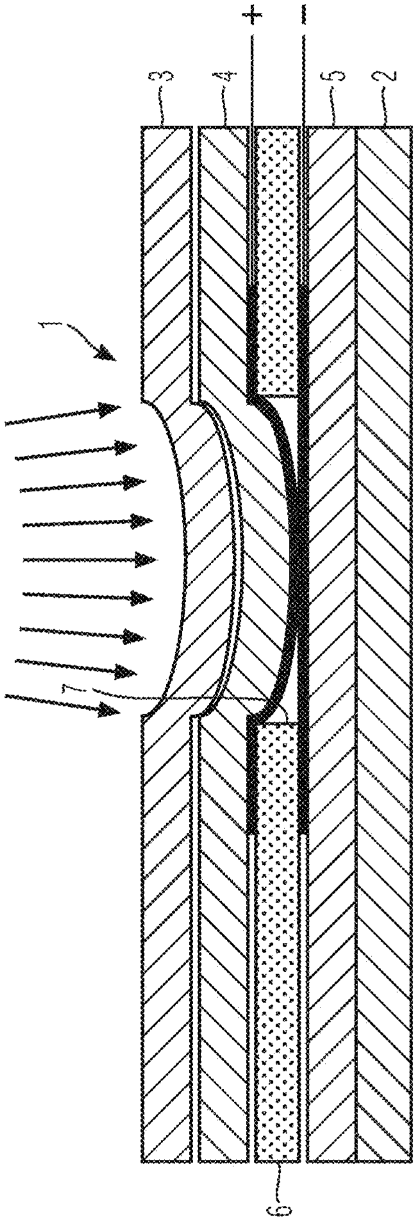
Fig. 2 Prior art
FIG. 2 is a schematic section through the SBR sensor from FIG. 1, in a loaded state.
Figure 3:
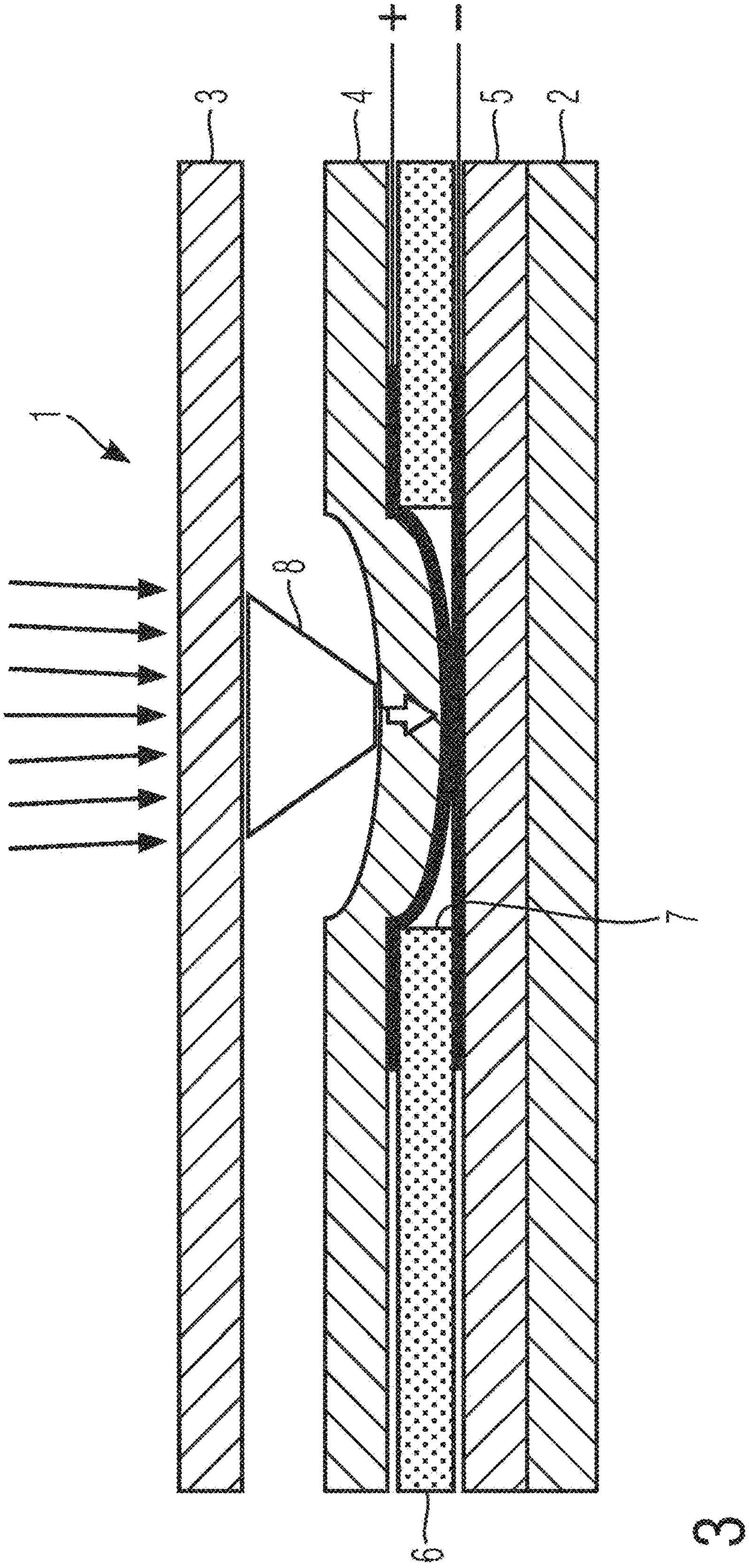
FIG. 3 is a schematic section through an SBR sensor according to an embodiment of the invention, in a loaded state.

Of course, in addition to the layers listed here, the vehicle seat may also have further textile layers or foam layers for upholstery, which are not illustrated in the schematic FIGS. 1 to 3.

It is also possible for the SBR sensor 1, this being true of the known prior art and of the refinement according to the invention, to be used not only for a seat surface of the vehicle seat but also, for example, for a backrest of the vehicle seat.

FIG. 2 shows a schematic section through the SBR sensor 1 from FIG. 1, in a loaded state. A force which is exerted, for example, on the vehicle seat in the motor vehicle by a vehicle occupant is represented schematically by nine arrows in the direction of the seat cover 3. As can be seen in FIG. 2, the two conductive coatings of the surface 4 and the lower surface 5 are in contact in a load situation, as a result of which the circuit is closed. It can therefore be detected by way of an evaluation unit, for example an electronic control device, whether or not a vehicle occupant has sat down on the vehicle seat.

The conductive coating of the surface 4 and of the lower surface 5 can be produced by way of a silver/graphite layer, for example. As can furthermore be seen in FIG. 2, the pressure on the SBR sensor 1 is very diffuse, as a result of which clear detection of whether or not an occupant has sat down on the vehicle seat is very difficult for different geometries, for example depending on an upholstery of the vehicle seat, or a vehicle seat structure.

FIG. 3 shows a schematic section through an SBR sensor 1 according to an embodiment of the invention, in a loaded state. The loading is again represented schematically by nine arrows in the direction of the seat cover 3. As can be seen from FIG. 3, a pressure element 8 is arranged between the seat cover 3 and the surface 4. This refinement according to the invention turns the diffuse pressure, which an occupant exerts on the vehicle seat, into a specific pressure on the SBR sensor 1. This specific pressure is represented by a small arrow on the surface 4 in the region of the pressure element 8. The SBR sensor 1 is therefore actuated irrespective of a different upholstery of the vehicle seat.

The pressure element 8 can advantageously be composed of a metal and/or a plastic and/or a wood. The developers of a vehicle seat for a motor vehicle therefore have diverse selection options for the correct selection of material, in respect of the price, the strength and the vehicle seat structure or the upholstery. In a further exemplary embodiment, the pressure element 8 can also be composed of an elastic material, e.g. silicone or rubber, which further increases the selection of material.

Furthermore, the pressure element 8 can advantageously have any outer shape, wherein the pressure element 8 is preferably cuboidal, elliptical, cylindrical, spherical, prism-shaped or in the form of a truncated cone, as illustrated in the present exemplary embodiment.

In the embodiment illustrated, the pressure element 8 has a smaller supporting surface on the side facing the seat core 2 than on the side facing the seat cover 3. With this embodiment, the compressive force can advantageously be focused in a defined manner on the SBR sensor 1.

Preferably, at least two spatially spaced-apart SBR sensors 1 (not illustrated) are provided for a vehicle seat, wherein a dedicated pressure element 8 is provided for each SBR sensor 1. This refinement makes it possible to draw conclusions regarding the height or weight of the vehicle occupant, for example, by way of the electronic control device, not illustrated.

In a further exemplary embodiment, the pressure elements 8, if at least two SBR sensors 1 are provided, are connected to each other via connecting elements, not illustrated. This refinement facilitates the installation of the pressure elements 8 in a vehicle seat.

In a first exemplary embodiment, the SBR sensor 1 and the pressure element 8 form one physical unit, which in turn facilitates the installation of the SBR sensor 1 in the vehicle seat.

In a further exemplary embodiment, the SBR sensor 1 and the pressure element 8 are separate components, which somewhat reduces production costs, but as a result of which the fitting of the pressure element 8 and the SBR sensor 1 in the vehicle seat is made somewhat more difficult.

Of course, the effect according to the invention is produced not only for an electric SBR sensor 1 but also for pneumatic, capacitive or inductive SBR sensors 1.

In summary, the surface 4 and the lower surface 5 of the SBR sensor 1 are pressed together by the pressure of the upholstery layers located thereabove, this being triggered by the occupant sitting down. The pressure from the upholstery layers is somewhat diffuse and imprecise. Provision of individual pressure elements 8 between the seat cover 3 and the surface 4 makes it possible for the surface 4 and the lower surface 5 of the SBR sensor 1 to be loaded in a highly specific way. These pressure elements 8 can be composed of simple materials (for example plastic, rubber, wood, metal, etc.) and can differ in shape. They can be connected, similarly to a strip along a row of SBR sensors 1, or attached individually to the SBR sensors 1. The pressure elements 8 receive the diffuse upholstery pressure described, generally from above, and, owing to their shape and size, transmit a precise pressure to the SBR sensors 1. The pressure elements 8 can be produced in any shape rapidly and cost-effectively and can be adjusted for each point and for each individual SBR sensor 1. Therefore, on the same seat construction, the response of the SBR sensors 1 and the sensitivity of the SBR sensor 1 as a whole can be rapidly and easily adapted to suit the requirement for occupancy detection. Owing to the low overall height required, the pressure elements 8 do not have any noticeable effect on seat comfort.

LIST OF REFERENCE SIGNS

1. SBR sensor (seat occupancy detection sensor)
2. Seat core
3. Seat cover
4. Surface
5. Lower surface
6. Spacer element
7. Aperture
8. Pressure element

What is claimed is:

1. A vehicle seat, comprising:

a seat occupancy detection sensor (SBR sensor);

a seat core, and a seat cover, wherein the SBR sensor is arranged flat between the seat core and the seat cover, the SBR sensor has a first upper side facing the seat cover, and a pressure element is arranged between the seat cover and the first upper side.

2. The vehicle seat according to claim 1, wherein the pressure element is made from a metal, a plastic and/or a wood.

3. The motor vehicle according to claim 1, wherein the pressure element is made from an elastic material.

4. The motor vehicle according to claim 1, wherein the pressure element is cuboidal, elliptical, cylindrical, spherical, prism-shaped or in a truncated cone form.

5. A vehicle seat, comprising:

a seat occupancy detection sensor (SBR sensor);

a seat core, and a seat cover, wherein the SBR sensor is arranged flat between the seat core and the seat cover, the SBR sensor has a first upper side facing the seat cover, and a pressure element is arranged between the seat cover and the first upper side, wherein the pressure element has a smaller supporting surface on a side facing the seat core than on a side facing the seat cover.

6. The motor vehicle according to claim 1, wherein at least two spatially spaced-apart SBR sensors are provided for the vehicle seat, and a respective pressure element is provided for each SBR sensor.

7. The motor vehicle according to claim 6, wherein each respective pressure element is connected to the other via connecting elements.

8. The motor vehicle according to claim 1, wherein the SBR sensor and the pressure element form one physical unit.

9. The motor vehicle according to claim 1, wherein the SBR sensor and the pressure element are separate components.

10. A vehicle seat, comprising:

a seat occupancy detection sensor (SBR sensor);

a seat core, and a seat cover, wherein the SBR sensor is arranged flat between the seat core and the seat cover, the SBR sensor has a first upper side facing the seat cover, and a pressure element is arranged between the seat cover and the first upper side, wherein a surface of the SBR sensor is a first current-conductive structure and a lower surface facing the seat core is a second current-conductive structure, and a spacer element having at least one aperture is provided between the surface and the lower surface, wherein a circuit is closed when the surface and the lower surface are in contact in a region of the aperture.

* * * * *